United States Patent
Lomax, Jr. et al.

(10) Patent No.: US 7,347,978 B2
(45) Date of Patent: Mar. 25, 2008

(54) ELECTRICALLY HEATED CATALYST SUPPORT PLATE AND METHOD FOR STARTING UP WATER GAS SHIFT REACTORS

(75) Inventors: Franklin D. Lomax, Jr., Arlington, VA (US); Christopher T. Gricius, Alexandria, VA (US); John S. Lettow, Washington, DC (US)

(73) Assignee: H2Gen Innovations, Inc., Alexandria, VA (US)

( * ) Notice: Subject to any disclaimer, the term of this patent is extended or adjusted under 35 U.S.C. 154(b) by 713 days.

(21) Appl. No.: 10/637,579

(22) Filed: Aug. 11, 2003

(65) Prior Publication Data

US 2004/0109794 A1    Jun. 10, 2004

Related U.S. Application Data

(60) Provisional application No. 60/402,067, filed on Aug. 9, 2002.

(51) Int. Cl.
 *F01N 3/00* (2006.01)
(52) U.S. Cl. ............................................. 422/174
(58) Field of Classification Search ............... 422/174, 422/175, 177, 199; 392/309, 327, 407
 See application file for complete search history.

(56) References Cited

U.S. PATENT DOCUMENTS

| | | | | |
|---|---|---|---|---|
| 3,902,550 A * | 9/1975 | Martin et al. | ........... | 165/104.16 |
| 4,205,045 A * | 5/1980 | Westernacher et al. | ..... | 422/192 |
| 4,905,249 A * | 2/1990 | Turner | ......................... | 372/59 |
| 5,753,194 A | 5/1998 | Heil et al. | | |
| 6,126,908 A | 10/2000 | Clawson et al. | | |
| 6,491,877 B1 * | 12/2002 | Eckardt et al. | .............. | 422/174 |
| 2002/0081253 A1 * | 6/2002 | Abe | ........................... | 422/211 |
| 2002/0088740 A1 | 7/2002 | Krause et al. | | |

* cited by examiner

*Primary Examiner*—Glenn A. Caldarola
*Assistant Examiner*—Tom Duong
(74) *Attorney, Agent, or Firm*—Oblon, Spivak, McClelland, Maier & Neustadt, P.C.

(57) ABSTRACT

A heated catalyst support device for a reactor including a reactor vessel containing a bed of catalyst particles. The device includes a permeable support plate having a channel extending therethrough, where the support plate is adapted to contact the bed of catalyst particles. The device further includes a heating element extending through the channel in the support plate. A method for starting up a water gas shift reactor is provided that includes applying heat to the bed of catalyst particles using the heating element, measuring a temperature in the bed of catalyst particles. and starting up the water gas shift reactor when the temperature exceeds a saturation temperature for a desired operating pressure.

22 Claims, 2 Drawing Sheets

ELECTRICALLY HEATED CATALYST SUPPORT PLATE AND METHOD FOR STARTING UP WATER GAS SHIFT REACTORS

CROSS-REFERENCE TO RELATED APPLICATIONS

This application is related to U.S. Application Ser. No. 60/214,737, filed on Jun. 29, 2000; U.S. application Ser. No. 09/588,575, filed on Jun. 7, 2000; U.S. application Ser. No. 09/642,008, filed on Aug. 21, 2000; U.S. application Ser. No. 09/928,437, filed on Aug. 14, 2001; U.S. application Ser. No. 10/097,745, filed on Mar. 15, 2002; U.S. application Ser. No. 10/116,163, filed on Apr. 5, 2002; and U.S. Application Ser. No. 60/370,702, filed on Apr. 9, 2002, all of which are incorporated herein by reference in their entirety. Additionally, the present application is a utility application claiming priority to U.S. Prov. App. Ser. No. 60/402,067, filed on Aug. 9, 2002, which is incorporated herein by reference in its entirety.

BACKGROUND OF THE INVENTION

Discussion of the Background

Chemical reactors employing beds of solid catalyst particles are used to conduct many useful industrial processes. Such packed bed rectors often have a large thermal inertia, and can take many hours to reach their operating temperature during process startup. This is especially true if the packed bed reactor is used to promote a gas phase reaction where the thermal mass flux of the reactant gases is low relative to the thermal inertia of the packed bed.

An especially deleterious condition can result when the packed bed reactor is used to process a condensable vapors such as water or hydrocarbon vapors. In this case, if the bed has not reached the boiling temperature of the condensable species, liquid formation is the inevitable result. A prime example of such a process is the water gas shift reaction, where water vapor is reacted with carbon monoxide to produce hydrogen and carbon dioxide. In reactions such as water gas shift, the condensed liquid can be subsequently vaporized on the catalyst particles, which are generally porous, and have relatively low mechanical strength. This vaporization can generate relatively extreme mechanical stresses inside the catalyst particles, and can lead to their mechanical failure. The fractured catalyst particles can subsequently lead to severe operational difficulties such as fouling or plugging of the bed or of downstream process elements.

It is possible to forestall this condensation and subsequent vaporization and catalyst failure by heating up the packed bed using a stream of non-condensable vapor. This requires a ready supply of such vapor on hand. Since many catalysts are sensitive to exposure to oxygen, this generally means supply of an inert fluid. This undesirably increases the complexity of the process plant. Again, water gas shift reactors are a prime example as they typically employ air-sensitive catalysts.

Alternative methods employed to heat packed bed reactors during startup have included heating the reactor with second fluids such as heated oil or steam through a heat exchange loop. These methods are advantageous if such heating fluids are readily available, but increase system complexity undesirably if they must be provided solely for heating up the packed bed reactors. Alternatively, commercially-available electrical heating elements may be provided. Examples of such elements include band, or barrel heaters which may be attached to the outside of the reactor. These elements must transfer heat through the reactor vessel wall, undesirably requiring that wall to have good heat transfer properties. Further, even with good insulation, much heat applied in this fashion is lost to the environment, increasing the amount of electrical energy required to heat up the reactor.

Immersion heating elements are also readily available, and these may be submerged directly into the catalyst bed. Placing the heating elements within the catalyst bed offers obvious advantages in the amount of heat supplied directly to heating the catalyst bed relative to the fraction lost to ambient. Immersion heating elements present other special problems though, as their high rate of heat input can impart significant thermal stresses on individual catalyst particles. These particles, which are generally constructed from brittle ceramic materials, are susceptible to fracture under high thermal stress. Thus, application of immersion heaters is limited to heaters of low heat output to minimize thermal stresses. This undesirably increases the number of heating elements required to obtain an acceptable rate of heating without causing catalyst failure.

SUMMARY OF THE INVENTION

Accordingly, the present invention advantageously provides an apparatus for employing immersion heating elements of high heat output to heat packed beds of catalyst particles without causing high thermal gradients in the catalyst particles.

The present invention advantageously integrates the mechanical support of the catalyst bed with the means of catalyst heating.

The present invention advantageously provides for ease of replacement of defective heating elements, even while the reactor is operating.

The present invention advantageously provides mechanical reinforcement of the reactor vessel.

The present invention advantageously provides a means of preventing catalyst particle fragments from fouling downstream process elements The present invention further advantageously provides a method for starting water gas shift reactors employing electrical heating to prevent water condensation on the catalyst particles.

The present invention advantageously provides a method for starting water gas shift reactors employing the combination of electrical heating and heating with a non-condensable vapour.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF THE INVENTION

The advantages and embodiments of the present invention will be better understood from the following detailed description.

Figure 1:
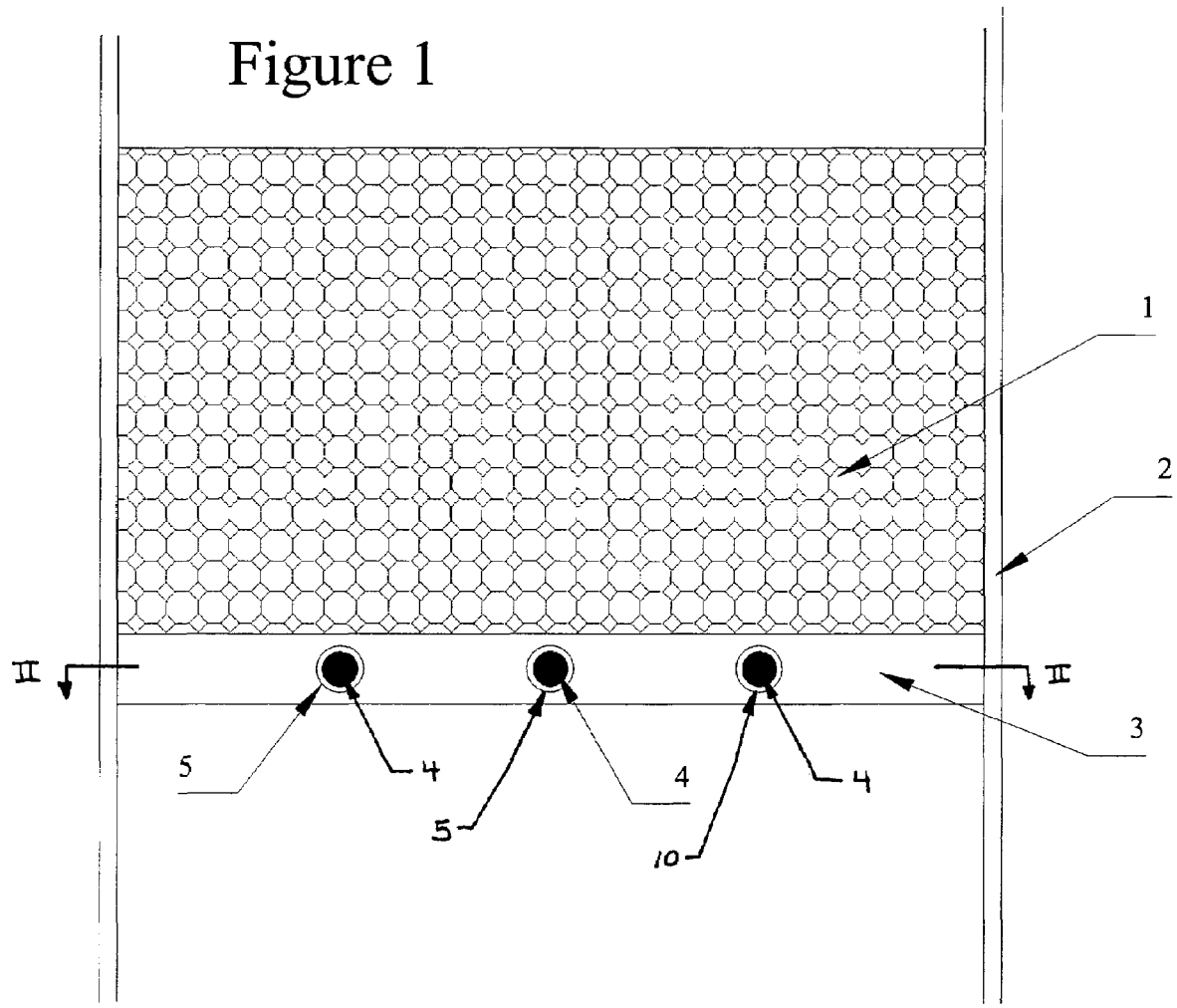
FIG. 1 shows a schematic cross-sectional side view of a packed bed reactor supported by the electrically-heated catalyst support plate of the present invention, taken along line I-I in FIG. 2.

FIG. 1 shows a packed bed of catalyst particles 1, contained within a reactor vessel 2. The catalyst particles are depicted as spherical, but other shapes are known in the art. The catalyst particles may be varying degrees of porosity, may be of homogeneous or heterogeneous composition, and may be formed from metals or non-metals. In short, the physical form of the catalyst particles does not limit the practice of the present invention in any way. In fact, the catalyst particles may be replaced by a catalyzed monolithic body if desired, and the function of the present invention would not be affected in any way.

The catalyst particles are supported by a support plate 3. This support plate is in intimate mechanical contact with a number of heater channels 5, which can each accommodate one or more electrical heating elements 4. Although the heating elements and their channels are depicted here having a round plan-form, other shapes of heating elements are well-known to those skilled in the art. The fit between the heating elements 4 and their heating element channels 5 is preferably very close to promote effective heat transfer. The selection of the appropriate clearances between these components, and the provision of thermal greases, powders, anti-seize compounds and the like are well known in the art.

The heating elements 4 transfer heat through the walls of their fluid-impermeable channels 5 into the support plate 3. The support plate 3 is preferably constructed from a material having excellent heat transfer properties, such as metal or carbon. The support plate must be permeable to fluid flow normal to its surface. Catalyst support plates fabricated from perforated metal plate, metal screens, expanded metal, sintered metal fibers, metal foams and carbon foams are all well known. Although the present invention may be practiced using any of these materials, support plates having which completely surround the heating element channels 5 are preferred. Metal foam support plates are especially preferred.

The heat transferred from the heating element channels 5 to the support plate 3 spreads rapidly through the support plate, as it has a low resistance to thermal transfer. The packed bed of catalyst particles has a much higher resistance to thermal transfer, such that the catalyst support plate assembly of the present invention operates in an essentially isothermal manner, and thus transfers the heat from the electric heaters 4 to the catalyst much more uniformly than possible in the prior art. This advantageously reduces the thermal stresses in the catalyst particles, and minimizes their tendency to fracture due to thermal stress.

Although the catalyst support plate of the present invention is most advantageously employed beneath a bed of catalyst, it may also be applied above a bed of catalysts if they are compressed to ensure adequate mechanical contact between the catalyst and the upper plate. Further, a single reactor may advantageously employ more than one catalyst support plate of the present invention in order to be divided into a number of heated beds in series to increase the total allowable heating capacity of the reactor.

The size of the openings in the catalyst support plate must be selected to be smaller than the catalyst particles. In one manifestation of the present invention, the size of the openings is selected to exclude fragments of catalyst particles likely to damage downstream equipment in the chemical process. In this regard, catalyst support plates fabricated from sintered fibers or powders or metal or carbon foams are especially preferable, as they can provide advantageous filtering properties depending upon the service in question.

Figure 2:
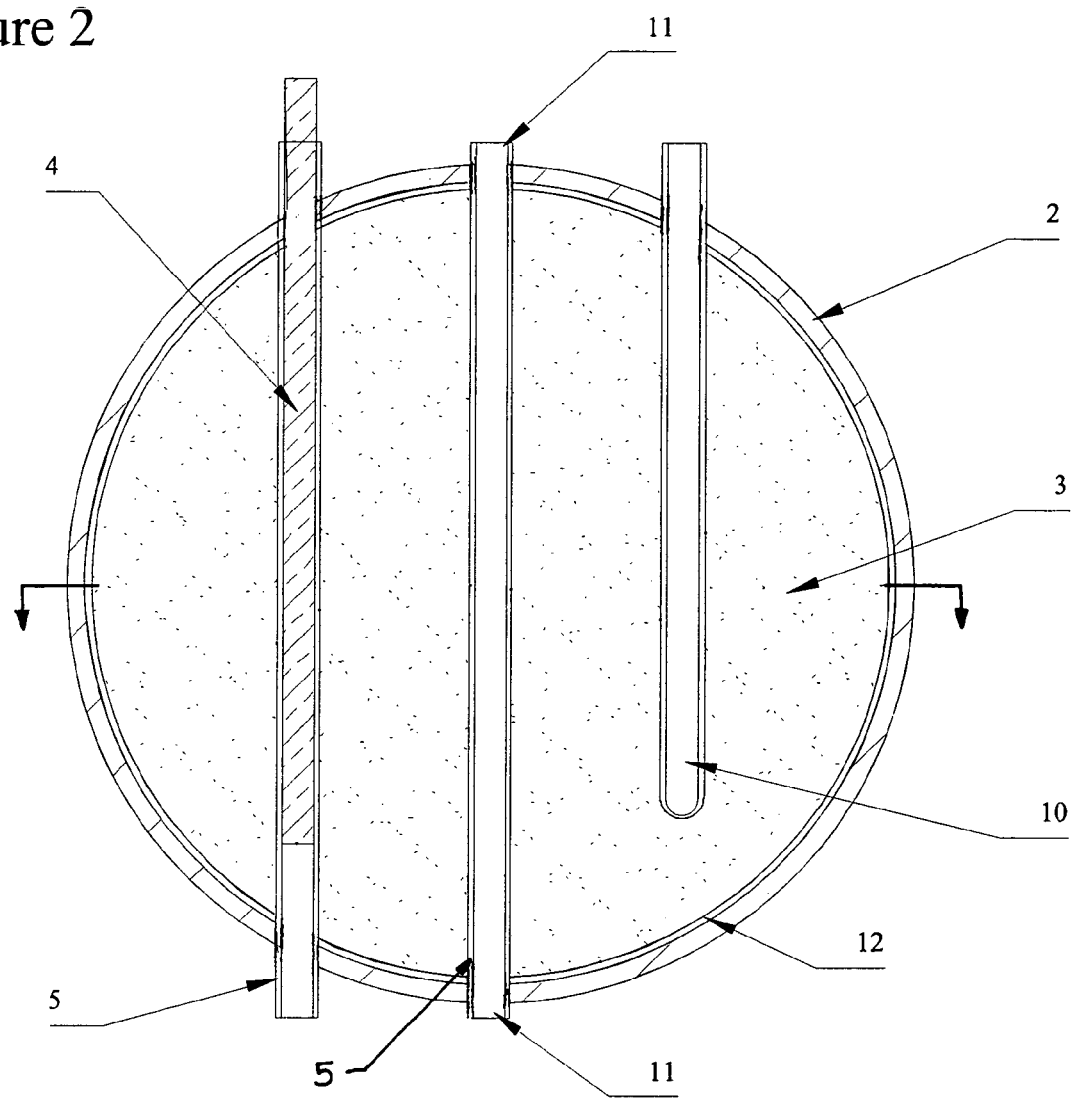
FIG. 2 shows a cross-sectional plan view of the electrically-heated catalyst support plate of the present invention, taken along line II-II of FIG. 1.

FIG. 2 shows a plan view of the electrically-heated catalyst support plate of the present invention. In this case, the reactor vessel 2 has a round planform. The planform of the reactor vessel does not limit the application of the present invention. It is critical that the catalyst support plate 3 fit closely enough to the reactor vessel wall 2 to exclude catalyst particles or fragments thereof from bypassing the catalyst support plate through the gap 12. In the limit, this gap 12 may be completely eliminated by providing a tight mechanical fit with the vessel wall 2. Further advantages may be gained by permanently joining the support plate to the wall via brazing, welding, adhesive bonding or other similar processes. Further, mechanical sealing features may be applied if desired.

The heating element channels 5 penetrate the vessel wall 2, and mechanically support the catalyst support plate 3. The joints between the vessel wall and the heating element must be fluid impermeable, and may be achieved through the use of welding, brazing, adhesive bonding, soldering, the use of threaded or compression connectors, or by other methods apparent to one skilled in the art. These channels must also be provided with mechanical contact with the catalyst support plate to ensure good heat transfer. This contact may also be achieved using a variety of methods, such as mechanical interference fit, brazing, soldering, welding adhesive bonding and the like. Variations on the method of construction are envisioned where a catalyst support plate body which is fluid impermeable in the regions of the heating element channels is joined to the reactor walls 2 without the need for separate channel components 5. An example of this construction would be a cast catalyst support plate provided with perforations to facilitate flow of the process gas normal to the support plate. Such a catalyst support plate could be continuously joined to the reactor vessel wall using any technique capable of providing a fluid impermeable seal. Another example of this alternative construction would be a sintered porous metal catalyst support plate where the heating element channels were infiltrated to provide a fluid impermeable zone.

When the catalyst support plate of the present invention is supplied with fluid impermeable heating element channels 5, the heating elements may be replaced without loss of process fluid, even when the reactor is operational. A less preferred embodiment of the present invention would supply a catalyst support plate where the zone of the heating element channels 5 is not fluid impermeable. In this less preferred embodiment, the fluid impermeable seal must be affected between the heating element 4 and the vessel wall 2, for instance through the use of compression fittings. This less preferred embodiment requires the process to be stopped to facilitate element replacement without loss of process fluid. This consideration is especially important for processes operating at high pressures and/or temperatures, or handling hazardous process fluids.

The heating element support channels 5 may penetrate the reactor vessel 2 at one or more points. Heating element channels having two openings 11 are preferred as they facilitate the replacement of defective heating elements. A heating element channel 10 having only one opening may require drilling to remove heating elements which have bonded to the heating element channels due to corrosion or diffusion welding. This undesirably increases the labor required to replace defective heating elements. The preferred heating element channels 5 having two openings 11 may advantageously be provided with features at one or more opening to facilitate the use of mechanical aids to extract defective heating elements. An example of this would be threads on the inside or outside of the heating element channel to facilitate attachment of a mechanical or hydraulic ram for removal of heating elements.

Another advantage of heating element channels 5 which are attached to the reactor vessel wall 2 in more than one location is mechanical reinforcement. Whether the heating element channels are employed in reactors operating at super-atmospheric or sub-atmospheric pressures, they serve to stiffen the vessel, potentially allowing reductions in overall vessel thickness and weight.

The electrically-heated catalyst support plate may be used to special advantage in supplying heat to packed bed catalytic reactors of all types. This heat may be applied to facilitate fast start-up, to prevent condensation of process vapours, or to provide heat to a process stream during regular operation.

Electrical heating in general is particularly advantageous for water gas shift reactors for converting carbon monoxide and water to carbon dioxide and hydrogen. Water gas shift reactors are increasingly employed in advanced energy systems where rapid system startup is a crucial performance metric. Traditional water gas shift catalysts include mixtures of iron oxide and chromium oxide powders pressed into tablets. During operation of the reactor, these catalysts undergo phase transformations which precipitate a remarkable loss of mechanical strength. During startup of the reactor, these catalysts are particularly prone to mechanical attrition due to steam evolution during bed heat up. Even with advanced catalysts, repeated water condensation and steam evolution leads to appreciable mechanical attrition of the catalysts.

The inventors have found that heating water gas shift reactors using normal process gas invariably leads to mechanical failure of the catalysts. Thus, the provision of a heated, non-condensable vapour may desirably be employed to avoid this degradation. This method can require an objectionable period of time to reach the desired operating temperature.

The inventors have found that electrically-heating the water gas shift reactor can dramatically reduce the period of time required to reach a catalyst temperature above the saturation temperature. A preferred method of operation employs electrical heating elements controlled by a thermocouple measuring the temperature in the water gas shift catalyst bed. In a preferred embodiment of the startup method of the present invention, the electric heating elements are operated to heat the bed until the bed temperature exceeds the saturation temperature at the desired operating pressure.

Another preferred embodiment of the present invention provides for heating the water gas shift reactor with both electric heating elements and a vapor which is not condensable at temperatures of interest. This preferred method provides for gradual removal of any residual condensed water on the catalyst at a low rate, such that essentially no condensed water remains when the catalyst bed reaches temperatures where wholesale boiling is likely to occur.

An especially preferred embodiment of the present invention provides a water gas shift reactor with a catalyst which is not sensitive to oxygen. In this especially preferred embodiment, the water gas shift reactor is heated by the electric heating elements and by atmospheric air. This especially preferred method advantageously eliminates the requirement for the provision of an inert gas for heating and drying the catalyst. This significantly reduces the cost and complexity of the water gas shift reactor system. This especially preferred embodiment provides the further advantage that the heated air will react with any carbonaceous deposits or adsorbed contaminants such as sulphur and remove these species in the gas phase as carbon or sulphur oxides. This especially preferred method has the further benefit with some catalysts of redispersing the catalyst active metal, advantageously increasing the catalytic activity of the reactor. A water gas shift reactor operated according this especially preferred method of the present invention will heat up faster, use less energy, have higher catalytic activity, less catalyst attrition, less fouling and longer life than a reactor operated using methods known in the prior art. The especially preferred startup method of the present invention is most especially preferably executed using the electrically heated catalyst support plate of the present invention.

What is claimed as new and desired to be secured by Letters Patent of the United States is:

1. A reactor comprising:
   a reactor vessel;
   a bed of catalyst material provided within said reactor vessel;
   a permeable support plate having a plurality of channels extending therethrough, said support plate having a planar shape and being in contact with said bed of catalyst material; and
   a plurality of heating elements extending through said plurality of channels in said support plate,
   wherein said plurality of channels all extend in directions parallel to a plane of said planar shape of said support plate wherein said plurality of heating elements are electrical heating elements.

2. The reactor according to claim 1, wherein said support plate is made of a perforated metal plate, a metal screen, expanded metal, sintered metal fibers, metal foam, or carbon form.

3. The reactor according to claim 1, further comprising:
   a second bed of catalyst material provided within said reactor vessel;
   a second permeable support plate having an additional channel extending therethrough, said second support plate being provided in contact with said second bed of catalyst material; and
   an additional heating element extending through said additional channel in said second support plate.

4. The reactor according to claim 1, wherein at least one channel of said plurality of channels extends through a wall of said reactor vessel at one or more locations.

5. The reactor according to claim 1, wherein at least one channel of said plurality of channels is mechanically joined to a wall of said reactor vessel at one or more locations.

6. The reactor according to claim 1, wherein at least one channel of said plurality of channels has one or more openings.

7. The reactor according to claim 6, wherein said at least one channel has external threads or internal threads at said one or more openings.

8. The reactor according to claim 1, wherein at least one channel of said plurality of channels has means for facilitating extraction of a heating element from said at least one channel.

9. The reactor according to claim 1, wherein said support plate has a surface contacting said bed of catalyst material, and wherein said support plate is configured to be permeable to fluid flow through said surface in a direction normal to said surface.

10. The reactor according to claim 9, wherein said plurality of channels all extend in directions parallel to said surface.

11. The reactor according to claim 1, wherein said plurality of channels each extend in a linear direction.

12. The reactor according to claim 1, wherein said plurality of channels are impermeable to fluid.

13. A heated catalyst support device for a reactor including a reactor vessel containing a bed of catalyst material, said heated catalyst support device comprising:
   a permeable support plate having a plurality of channels extending therethrough, said support plate having a planar shape and being adapted to contact the bed of catalyst material; and
   a plurality of heating elements extending through said plurality of channels in said support plate,
   wherein said plurality of channels all extend in directions parallel to a plane of said planar shape of said support plate wherein said plurality of heating elements are electrical heating elements after "plate".

14. The heated catalyst support device according to claim 13, wherein said support plate is made of a perforated metal plate, a metal screen, expanded metal, sintered metal fibers, metal foam, or carbon form.

15. The heated catalyst support device according to claim 13, wherein at least one channel of said plurality of channels has one or more openings.

16. The heated catalyst support device according to claim 15, wherein said at least one channel has external threads or internal threads at said one or more openings.

17. The heated catalyst support device according to claim 13, wherein at least one channel of said plurality of channels has means for facilitating extraction of a heating element from said at least one channel.

18. The heated catalyst support device according to claim 13, wherein said support plate has a surface adapted to contact the bed of catalyst material, and wherein said support plate is configured to be permeable to fluid flow through said surface in a direction normal to said surface.

19. The heated catalyst support device according to claim 18, wherein said plurality of channels all extend in directions parallel to said surface.

20. The heated catalyst support device according to claim 13, wherein said plurality of channels each extend in a linear direction.

21. The heated catalyst support device according to claim 13, wherein said plurality of channels are impermeable to fluid.

22. A reactor comprising:
   a reactor vessel having a fluid flow path therein
   a permeable support plate provided within said vessel and extending across said fluid flow path, said support plate having a channel extending therethrough;
   a bed of catalyst material provided within said vessel and provided in contact with said support plate; and
   a heating element extending through said channel in said support plate,
   wherein said support plate and said bed of catalyst material are provided in series along said fluid flow path,
   wherein said support plate has a planar shape, and
   wherein said channel extends in a direction parallel to a plane of said planar shape of said support plate wherein said plurality of heating elements are electrical heating elements after.

* * * * *